UNITED STATES PATENT OFFICE.

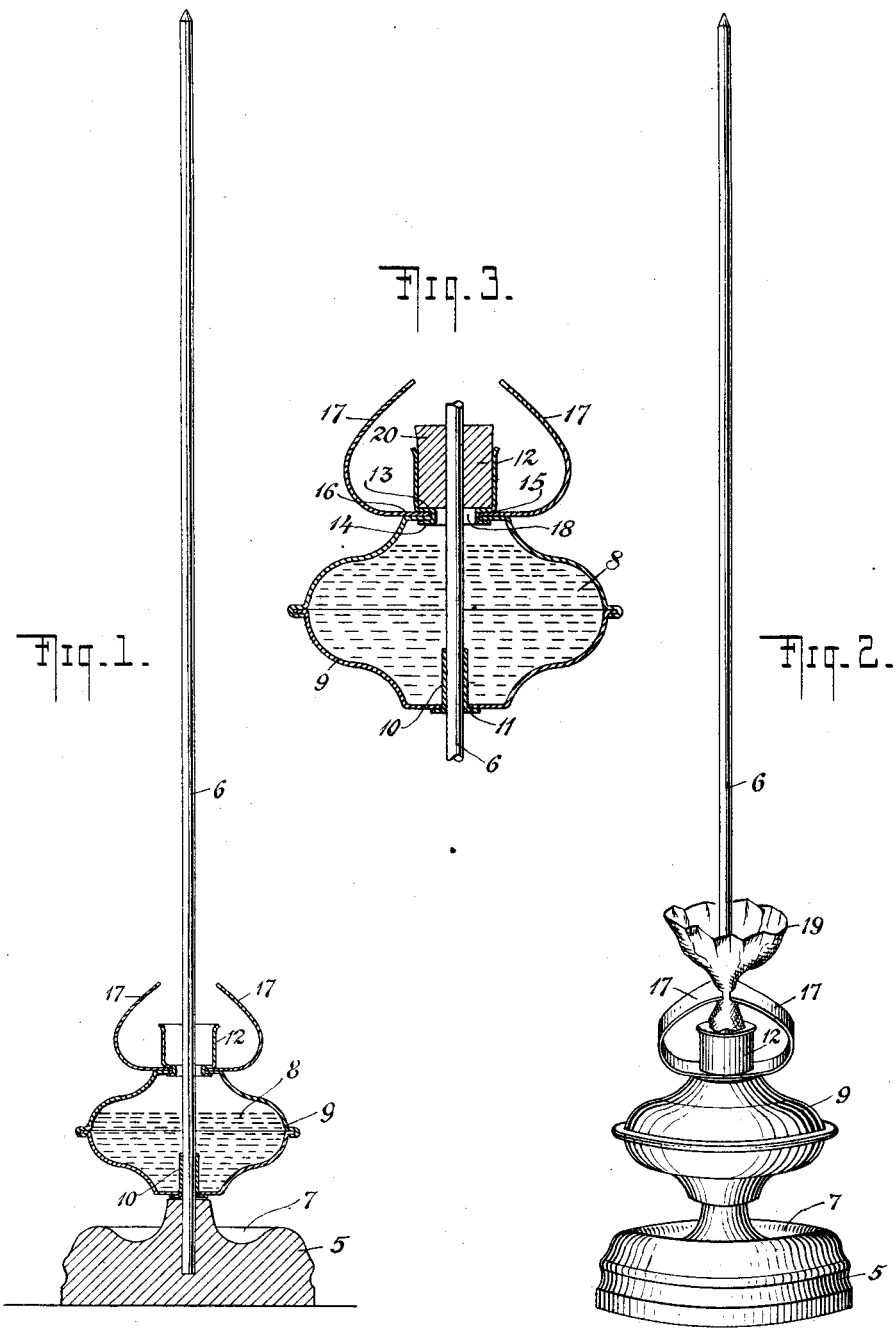

JACOB MOSS, OF NEW YORK, N. Y.

INSECT-TRAP.

1,050,376.  Specification of Letters Patent.  Patented Jan. 14, 1913.

Application filed September 18, 1912. Serial No. 720,951.

*To all whom it may concern:*

Be it known that I, JACOB MOSS, a citizen of the United States, and a resident of the borough of Manhattan, city, county, and State of New York, have invented certain new and useful Improvements in Insect-Traps, of which the following is a specification.

My invention relates to insect traps of the kind in which the insects are captured and retained by means of an adhesive spread upon or over a suitable surface, and has for its object to provide a carrier for said adhesive, suitably supported in a position of maximum efficiency.

My invention further contemplates the provision of a receptacle for the adhesive which may be readily combined with said carrier and used to spread the adhesive thereon.

A further object of my invention is to provide an easily operated device or scraper which, in the preferred form, is combined with the receptacle, and through the medium of which the captured insects and the adhesive which has become ineffective may be readily removed from the carrier in a cleanly and efficient manner.

An additional object of my improvement is to so construct the trap that the various parts thereof may be combined in an operative condition, ready for use and sold and shipped in this condition without danger of the parts becoming separated or the adhesive spilling or leaking from the receptacle.

My improvement will be fully described hereinafter and the features of novelty will be pointed out in the appended claims.

Reference is to be had to the accompanying drawings in which—

Figure 1 is a central sectional elevation of my improved trap. Fig. 2 is a perspective view thereof showing the scraping device in operative position, and Fig. 3 is a detail enlarged view similar to Fig. 1 and showing the parts in condition for shipment or storage.

In the drawings which illustrate one specific embodiment of my idea, the trap comprises a base 5 from which, in the form shown, a carrier 6 projects upwardly and has its one end fixed therein in any suitable manner. In the illustration, the carrier 6 comprises a rod which may be either solid or tubular, as desired, and upon which the adhesive is adapted to be spread as it will be hereinafter more fully described. The base 5 which is of a substantial size and preferably solid is provided with a recess 7 in its upper surface. Instead of having the one end of the carrier 6 fixed in the base, as shown, it will readily be seen that the same may be detachably connected therewith in any suitable manner as by screw threading, and further, that the base, instead of being solid, may be made of sheet material and hollow, if it is found desirable. The adhesive 8, which may be of any suitable kind, is contained in a receptacle 9 preferably constructed from sheet material and having any desired shape. The bottom of the receptacle 9 is provided with a central opening through which a tubular sleeve 10 extends into the interior of the receptacle, the said sleeve 10 being rigidly connected with the receptacle in any suitable manner, and being held against inward movement by means of a flange 11. At its upper portion, the said receptacle is provided with a second aperture, arranged in axial alinement with the sleeve 10 and preferably of larger diameter than said sleeve. A cup shaped element 12 is formed with a reduced neck 13 arranged to extend through said last named opening and to be rigidly secured therein in any suitable manner as for instance by means of a flange 14. The distance between the inturned portion of the element 12 and the flange 14 is such that when the element 12 is in position on the receptacle 9, an annular channel 15 will be formed between the lower surface of said inturned portion and the adjacent surface of the receptacle 9. This annular channel 15 serves to accommodate the scraper 16 which, in the present illustration comprises a single piece of preferably resilient material having an opening through which the neck 13 extends and shaped to form arms or members 17 which converge toward each other and normally have their ends spaced apart, the resilient tension of the arms being exerted in a direction to normally maintain said arms in this condition. In the preferred form the said scraper 16 is rotatable, in said channel 15, about the carrier 6 although this is not essential. The arms of the scraper may also be made separate from each other and secured in a manner other than shown, the only requirement being that the free ends of said arms are preferably movable toward and away from the carrier. With the construction above described it will be noted that the internal diameter of the neck 13 forming the aperture 18 is greater than the internal diameter of the sleeve 10 and is also slightly greater than the external diameter of the carrier 6. The internal diameter of the sleeve 10 is such that when the parts are assembled in operative condition, the said sleeve will fit upon the carrier 6 in what is known as a running fit and so as to be slidable lengthwise thereof.

In the assembled condition of the parts, the carrier 6, as shown best in Fig. 1, extends through the sleeve 10, through the adhesive 8 in the receptacle 9 and also through the aperture 18 and element 12. If the receptacle 9 is now moved lengthwise of the carrier 6 in an upward direction and then moved back to its initial position, the carrier 6 during this latter movement will become coated or covered with adhesive 8, the said adhesive passing out through the aperture 18 and being prevented from leaking out of said receptacle 9 at the bottom by the sleeve 10. During this operation, the aperture 18 which is only slightly larger in diameter than the carrier 6 by controlling the amount of adhesive which leaves the receptacle will prevent this adhesive from being applied to the rod in excessive quantities. At the same time, the cup shaped element 12 will serve to catch any drippings, and will return the same to the receptacle 9, the said element being also adapted for use as a funnel for filling said receptacle with adhesive as will be more fully described hereinafter. It will readily be seen that the sleeve 10, in addition to serving as a packing or stuffing box to prevent leakage at the bottom of the receptacle 9 also serves as a bearing for said receptacle during the sliding movements just described, and prevents wabbling thereof owing to the fact that said sleeve is of considerable axial length, and in consequence engages a considerable portion of the surface of the carrier 6. After the carrier 6 has been coated, as described, the trap is in an operative condition and any insect which may now come into contact with the carrier 6 will be caught by the adhesive thereon, and will be retained thereby until finally the entire exposed portion of the carrier 6 will be covered or substantially covered by captured insects. As soon as this condition of the trap is reached, it is preferable to remove the captured and dead insects as well as the adhesive which has become covered and substantially ineffective through exposure to the air. In order to accomplish this in a cleanly manner, a piece of ordinary paper 19 is first passed about the carrier 6, after which the arms 17 of the scraper are pressed toward each other so as to form this paper into a sort of funnel shape, and to firmly grip the carrier 6, it being understood that in the preferred construction the arms 17 are notched at their free ends in a manner to correspond to the shape of the carrier 6. If the said scraper is now moved lengthwise of the carrier 6 with the arms 17 remaining under pressure, the ends of said arms will continue to press the paper 19 about the carrier 6, and all of the captured insects, together with the adhesive or most of it will be scraped or wiped from said carrier and will drop into the funnel shaped cup formed by the paper 19. After the scraper has been thus moved along the entire exposed length of the carrier 6 and preferably slightly beyond the free end thereof, pressure is simply removed from the arms 17 which consequently owing to their resiliency immediately resume their normal position, or in other words, move away from each other and thus free the paper 19 and permit the same with the mass of insects and the adhesive therein to be readily removed or dropped into a suitable receiver. It will be noted that the receptacle 9 has followed this upward movement of the scraper, so that as the scraper is returned to its normal position at the lower end of the carrier, the receptacle 9 will also be moved downwardly lengthwise of the carrier 6 and back to its normal position, thus recoating the said carrier with a fresh supply of adhesive after which the trap will again be ready for use.

It will be seen that with my improved construction, the captured insects and the adhesive which has become ineffective, may be removed from the rod in a cleanly manner without coming into contact with either the hands of the person or with the scraper, while, at the same time, the carrier 6 is completely coated with a fresh supply of adhesive each time. It is, of course, to be understood that the use of the paper 19 is not absolutely necessary and may be dispensed with, if desired. If this is done the insects and the ineffective adhesive are simply scraped from the carrier 6 by the ends of the arms 17, the trap being meanwhile preferably held over a suitable receiving receptacle in the most effective position to permit the said adhesive and the insects to drop from the carrier into said receiving receptacle as the scraper is thus operated. The degree of pressure exerted on the carrier by the arms 17 of the scraper 16 can also be regulated so that the carrier may be thoroughly scraped or wiped to remove all adhesive, or if this adhesive or some of it is still in condition for use, the pressure of said scraper may be reduced so that the insects substantially alone may be removed and most of the adhesive be permitted to remain on the carrier for further use.

In order to permit the trap to be shipped in condition ready for immediate use and completely set up, I provide a cork or other closure 20 having an axial opening in alinement with the sleeve 10 and of a diameter to also closely fit the carrier 6. The trap is assembled ready for shipment and storage or immediate use by first placing the empty receptacle 9 upon the carrier 6 after which the adhesive 8 may be poured into said receptacle through the element 12 until the desired amount of adhesive is contained in said receptacle, leakage through the bottom thereof being prevented by the sleeve 10. The cork or other closure 20 may now be placed upon the carrier 6 and moved lengthwise thereof and finally forced into the element 12 in which condition the receptacle 9 is completely sealed. It is, of course, to be understood that the closure 20 snugly fits into said element 12 so as to be more or less firmly fixed therein against accidental removal, and that said closure firmly grips the carrier 6 and prevents leakage of the adhesive 8 at this point, and at the same time through frictional engagement with the carrier and the element 12 secures the receptacle 9 against accidental movement lengthwise of said carrier 6. In this condition the trap may safely be stored or shipped without danger of the parts becoming disarranged during such storing or shipment, or of the adhesive spilling or leaking from the receptacle 9. In order to set up the trap ready for use, all that is necessary is to remove the cork or other closure 20, after which the receptacle may be manipulated in the manner already fully described and the trap placed in the most advantageous position for use. No particular skill is therefore needed to bring the trap to an operative position, and no skill in assembling the parts is required of the purchaser, while the danger of incorrectly or incompletely assembling the various parts of the trap by such purchaser is absolutely done away with. Should any of the adhesive drop from the carrier 6, the same will be received in the recess 7 of the base 5 and retained thereby, which recess 7 will also serve to receive and retain any adhesive which might leak from the receptacle 9 should the sleeve 10 become loose or otherwise ineffective. It will readily be seen that my improved trap is extremely effective for the purposes for which it is designed, and is easily manipulated. The base 5 also provides an efficient support for the carrier so that the trap is not easily tilted or overturned and at the same time occupies a minimum of space and presents an attractive appearance. The carrier need not be in the nature of a rod, but may be simply a flat strip of substantially rigid material, or have any angular shape in cross section that may be desired, the free ends of the scraper in each case being made to conform.

Various changes in the specific form shown and described may be made without departing from the spirit of my invention.

I claim:

1. In an insect trap the combination of an adhesive covered carrier for capturing insects and a scraper comprising resilient arms normally spread apart and movable against the resilient tension into engagement with said carrier and movable lengthwise thereof to clean said carrier.

2. In an insect trap, the combination of an adhesive covered carrier for capturing insects and a scraper comprising members having free ends movable into and out of engagement with said carrier about an axis at an angle to the axis of the carrier and movable lengthwise thereof to clean said carrier.

3. In an insect trap, the combination of a carrier, a receptacle for an adhesive movable lengthwise of said carrier to spread the adhesive thereon, and a scraper comprising resilient arms secured on said receptacle and normally spread apart, said arms being movable against the resilient tension into engagement with said carrier and movable lengthwise thereof with said receptacle to clean said carrier.

4. In an insect trap, the combination of a carrier, a receptacle for an adhesive movable lengthwise of said carrier to spread the adhesive thereon, and a scraper comprising members secured on said receptacle and extending lengthwise of said carrier with their free ends normally out of engagement therewith, said members being movable to bring said free ends into engagement with said carrier, and being movable lengthwise thereof with said receptacle to clean said carrier.

In testimony whereof I have hereunto set my hand in the presence of two subscribing witnesses.

JACOB MOSS.

Witnesses:
JOHN A. KEHLENBECK,
M. H. LOCKWOOD.

---

Copies of this patent may be obtained for five cents each, by addressing the "Commissioner of Patents, Washington, D. C."